(12) United States Patent
Stover et al.

(10) Patent No.: US 10,989,851 B2
(45) Date of Patent: Apr. 27, 2021

(54) POLARIZER STACK

(71) Applicant: 3M INNOVATIVE PROPERTIES COMPANY, St. Paul, MN (US)

(72) Inventors: Carl A. Stover, St. Paul, MN (US); Kristopher J. Derks, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 81 days.

(21) Appl. No.: 16/301,106

(22) PCT Filed: May 16, 2017

(86) PCT No.: PCT/US2017/032798
§ 371 (c)(1),
(2) Date: Nov. 13, 2018

(87) PCT Pub. No.: WO2017/205106
PCT Pub. Date: Nov. 30, 2017

(65) Prior Publication Data
US 2019/0196076 A1    Jun. 27, 2019

Related U.S. Application Data

(60) Provisional application No. 62/342,021, filed on May 26, 2016.

(51) Int. Cl.
*G02B 5/30* (2006.01)
*G02B 27/28* (2006.01)
*G02F 1/1335* (2006.01)

(52) U.S. Cl.
CPC .............. *G02B 5/305* (2013.01); *G02B 5/30* (2013.01); *G02B 5/3083* (2013.01); *G02B 27/28* (2013.01);
(Continued)

(58) Field of Classification Search
CPC ........ G02B 5/30; G02B 5/3025; G02B 5/305; G02B 5/3083; G02B 27/28
(Continued)

(56) References Cited

U.S. PATENT DOCUMENTS 5,157,526 A * 10/1992 Kondo ............... C09K 19/3852
349/96
5,825,543 A    10/1998 Ouderkirk
(Continued)

FOREIGN PATENT DOCUMENTS

| | | |
|---|---|---|
| JP | 2008-165199 | 7/2008 |
| JP | 2009-103817 | 5/2009 |
| WO | WO 2007-0078965 | 7/2007 |

OTHER PUBLICATIONS

Business Wire announcement, "Nitto Denko and 3M Jointly Develop High-Durability, Ultrathin Integrated Polarizer; Next-Generation Brightness Enhancement Film Branded Vikuiti Advanced Polarizing Film", dated Dec. 21, 2005, downloaded from https://www.businesswire.com/news/home/20051220005550/en/Nitto-Denko-3M-Jointly-Develop-High-Durability-Ultrathin Integrated Polarizer on Jan. 10, 2019, 2 pages.

(Continued)

*Primary Examiner* — Ricky D Shafer
(74) *Attorney, Agent, or Firm* — Clifton F. Richardson

(57) ABSTRACT

A polarizer stack including an absorbing polarizer and a multilayer polymeric reflective polarizer bonded together is described. The absorbing polarizer has a first block axis and the reflective polarizer has a second block axis substantially parallel to the first block axis. The reflective polarizer has a shrinkage in a range of 0.4 percent to 3 percent along the second block axis when the reflective polarizer is heated at 95° C. for 40 minutes.

4 Claims, 4 Drawing Sheets

(52) U.S. Cl.
CPC .. *G02F 1/133536* (2013.01); *G02F 2202/022* (2013.01); *G02F 2202/28* (2013.01)

(58) Field of Classification Search
USPC ............ 359/485.03, 487.02, 489.11, 489.16
See application file for complete search history.

(56) References Cited

U.S. PATENT DOCUMENTS

| | | |
|---|---|---|
| 5,882,774 A | 3/1999 | Jonza |
| 5,962,114 A | 10/1999 | Jonza |
| 5,965,247 A | 10/1999 | Jonza |
| 6,025,897 A | 2/2000 | Weber |
| 6,797,396 B1 | 9/2004 | Liu et al. |
| 6,827,886 B2 | 12/2004 | Neavin |
| 6,916,440 B2 | 7/2005 | Jackson |
| 6,936,209 B2 | 8/2005 | Jackson |
| 6,939,499 B2 | 9/2005 | Merrill |
| 6,949,212 B2 | 9/2005 | Merrill |
| 7,271,951 B2 | 9/2007 | Weber |
| 7,468,204 B2 | 12/2008 | Hebrink |
| 7,738,763 B2 | 6/2010 | Ouderkirk |
| 2002/0015807 A1 | 2/2002 | Sugino |
| 2005/0122587 A1* | 6/2005 | Ouderkirk ............ B29C 55/023 359/487.05 |
| 2006/0262400 A1 | 11/2006 | Ouderkirk |
| 2008/0151147 A1 | 6/2008 | Weber |
| 2009/0303413 A1 | 12/2009 | Ohta et al. |
| 2013/0123459 A1 | 5/2013 | Merrill |
| 2015/0378077 A1 | 12/2015 | Haag |

OTHER PUBLICATIONS

International Search Report for PCT International Application No. PCT/US2017/032798, dated Jul. 25, 2017, 8 pages.

* cited by examiner

POLARIZER STACK

BACKGROUND

U.S. Pat. No. 6,025,897 (Weber et al.) describes a reflective polarizer and an absorbing polarizer bonded directly to the reflective polarizer.

SUMMARY

In some aspects of the present description, a polarizer stack including an absorbing polarizer and a multilayer polymeric reflective polarizer bonded together is provided. The absorbing polarizer has a first block axis and the reflective polarizer has a second block axis substantially parallel to the first block axis. The reflective polarizer has a shrinkage in a range of 0.4 percent to 3 percent along the second block axis when the reflective polarizer is heated at 95° C. for 40 minutes.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

A polarizer stack that includes both a reflective polarizer and an absorbing polarizer is sometimes used in display applications. For example, the inner polarizer (the polarizer facing away from the viewer) in a liquid crystal display (LCD) may include a reflective polarizer facing the backlight and an absorbing polarizer facing the display panel. The outer polarizer (the polarizer facing the viewer) in a liquid crystal display (LCD) typically includes just an absorbing polarizer and optionally a compensation film on the backlight side of that absorbing polarizer. Polarizer stacks and their use in display applications are generally described in U.S. Pat. No. 6,025,897 (Weber et al.) which is hereby incorporated by reference herein to the extent that it does not contradict the present description.

The reflective polarizer may be a polymeric multilayer reflective polarizer which includes a plurality of alternating polymeric layers. Such polymeric multilayer reflective polarizers are generally described in U.S. Pat. No. 5,882,774 (Jonza et al.); U.S. Pat. No. 5,962,114 (Jonza et al.); U.S. Pat. No. 5,965,247 (Jonza et. al.); U.S. Pat. No. 6,939,499 (Merrill et al.); U.S. Pat. No. 6,916,440 (Jackson et al.); U.S. Pat. No. 6,949,212 (Merrill et al.); and U.S. Pat. No. 6,936,209 (Jackson et al.); for example, each of which is hereby incorporated by reference herein to the extent that it does not contradict the present description. In brief summary, a polymeric multilayer reflective polarizer can be made by coextruding a plurality of alternating polymeric layers (e.g., hundreds of layers), uniaxially or substantially uniaxially stretching the extruded film (e.g., in a linear or parabolic tenter) to orient the film, and optionally applying a heat set to the oriented film as described in U.S. Pat. App. Pub. No. 2013/0123459 (Merrill et al.) and U.S. Pat. No. 6,827,886 (Neavin et al.), both of which are hereby incorporated by reference herein to the extent that they do not contradict the present description. Polymeric multilayer reflective polarizers include Dual Brightness Enhancement Film (DBEF) and Advanced Polarizing Film (APF), both available from 3M Company (St. Paul, Minn.). Alternatively, the reflective polarizer may be a Diffuse Reflective Polarizer Film where a non-multi-layer approach is utilized as described in U.S. Pat. No. 5,825,543 (Ouderkirk et al.); or a fiber polarizer film where polarizing fibers are used to make a polarizing film as described in U.S. Pat. No. 7,738,763 (Ouderkirk et al.).

Figure 3:
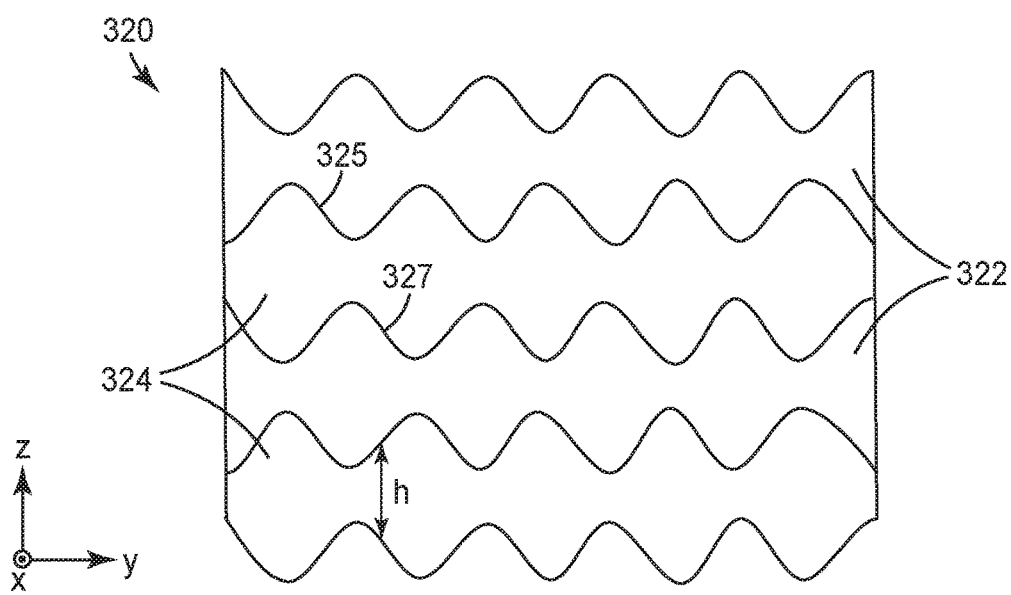
FIG. 3 is a schematic cross-sectional view of a portion of a multilayer reflective polarizer exhibiting micro-wrinkling.

In a polymeric multilayer reflective polarizer, the alternating polymeric layers may be referred to as microlayers. Conventionally, reflective polarizers have been selected to provide a minimum shrinkage under heat so that the reflective polarizer does not shrink when used in a display. This has been motivated by the low shrinkage of the glass plates used in the display and the belief that the reflective polarizer should have a correspondingly low shrinkage. An issue with using a polarizer stack having an absorbing polarizer and a conventional reflective polarizer in a display is the phenomena of micro-wrinkling which refers to a corrugation/buckling in the layers of the multi-layer film. Micro-wrinkling is characterized by adjacent interfaces between layers or the surface layer not being parallel to each other. An example of micro-wrinkling is illustrated in FIG. 3 which is a schematic cross-sectional view of a portion of a multilayer reflective polarizer 320. Multilayer reflective polarizer 320 includes alternating first layers 322 and second layers 324. The first and second layers 322 and 324 are alternating polymeric layers having differing refractive indices as is known in the art. For example, first and second layers 322 and 324 may have matching or substantially matching refractive indices along the x- and z-directions and may have substantially different refractive indices along the y-direction so that light polarized along the y-direction is reflected from the reflective polarizer 320 and light polarized along the x-direction is transmitted through the reflective polarizer 320. The reflective polarizer 320 exhibits a variation in the thickness h of the microlayers along at least the y-axis. Typically, the variation in thickness will be more pronounced along the block axis of the reflective polarizer than along the pass axis.

In FIG. 3, the first and second layers 322 and 325 have a thickness that is out of phase; that is, one layer is thickest where the adjacent layer is thinnest. In other cases, the thickness variation does not exhibit the out of phase variation illustrated in FIG. 3. More generally, in a micro-wrinkled film, adjacent interfaces (e.g., interfaces 325 and 327) between microlayers are not parallel to each other. In some cases, the variation in the shape of the interfaces varies with vertical position in the stack (i.e. varies in the z-direction). In some cases, the outer surfaces (air-surface interfaces) are flatter than interfaces between microlayers located closer to the center of the stack. Micro-wrinkling manifests itself as objectionable haze or iridescence in the films, and when examined under a microscope at a magnification of between 50 and 200 times is observed to be a permanent deformation of the optical layers. In contrast to micro-wrinkling, macro-wrinkling refers to the overall wrinkling of the multilayer film. As illustrated in FIG. 3, in a micro-wrinkled multilayer optical film, adjacent interfaces between microlayers are not parallel. A macro-wrinkled multilayer optical film that is not also micro-wrinkled, would have parallel interfaces between the microlayers.

In display applications, it is often desired that no micro-wrinkling is observable when the polarizer is held at 95° C. at 1000 hours. The long axis direction (x-axis in FIG. 3) of micro-wrinkles for a reflective polarizer/absorbing polarizer laminate tested at 95° C. for 1000 hours is typically in the pass-state direction. Shrinkage of the reflective polarizer in the block-state direction can be adjusted in order to frustrate such micro-wrinkling and provide a polarizer stack suitable for use in display applications. Micro-wrinkling is described in U.S. Pat. No. 7,468,204 (Hebrink et al.) which is hereby incorporated by reference herein to the extent that is does not contradict the present description. In U.S. Pat. No. 7,468,204, micro-wrinkling in multilayer optical film is reduced by utilizing low refractive index layers having a glass transition temperature substantially greater than the temperature at which the film is expected to be utilized or tested. According to the present description, polarizer stacks which exhibit substantially no micro-wrinkling are provided where the low index layers can have a glass transition temperature comparable to or lower than the temperatures expected to occur in display applications. For example, a polarizer stack may be tested at 95° C. or 100° C. to ensure that no micro-wrinkling occurs in a display application, and in some embodiments, the low index layers have a glass transition temperature less than 100° C., or less than 95° C., or less than 80° C., or less than 60° C. In some embodiments, the glass transition temperature of the low index layer is greater than 25° C. or greater than 50° C. As used herein, glass transition temperature refers to the glass transition temperature determined by differential scanning calorimetry.

In some embodiments, the absorbing polarizer utilized in the polarizer stacks of the present description is an iodine-doped polyvinyl alcohol (PVA) polarizer. Such polarizers include an oriented PVA layer impregnated with iodine. A suitable example of such a polarizer includes the Sanritz HLC2-5618S adhesive-backed polarizer film available from Sanritz Corporation, Tokyo, Japan. Other suitable absorbing polarizers include oriented polymer (such as PVA) polarizers impregnated with an organic dye.

According to the present description, it has been found that micro-wrinkling can occur when the absorbing polarizer shrinks more than the reflective polarizer when exposed to heat and that such micro-wrinkling can be significantly reduced or substantially eliminated by modifying the reflective polarizer to provide a desired range of shrinkage under heat. The shrinkage of the absorbing polarizer occurs predominately along the block axis of the absorbing polarizer when the absorbing polarizer contains a polymer, such as PVA, oriented along the block axis. Without intending to be limited by theory, the mechanism of micro-wrinkle reduction is believed to be that the additional shrinkage in the reflective polarizer prevents the reflective polarizer from being placed in compression while it is at an elevated temperature. This is supported by the data on shrinkage of reflective polarizers and an absorbing polarizer reported in the Examples which suggests that by appropriately choosing the shrinkage of the reflective polarizer a polarizer stack including the reflective polarizer and an absorbing polarizer bonded together can be obtained where the reflective polarizer is not placed in compression in any direction in the plane of the film when the polarizer stack is placed at 95° C. at 1000 hours, for example.

The modification to the reflective polarizer film that reduces or eliminates micro-wrinkling can be done by adjusting the heat set process applied to the film after the film is oriented. The heat set can be carried out in the last zones of the tenter oven used to orient the film as described in U.S. Pat. No. 6,827,886, previously incorporated by reference. Typically, such heat set processes are used in order to reduce or minimize the shrinkage of the film when heat is subsequently applied to the film. When it is desired to minimize the subsequent shrinkage of the film, the heat set temperature may be set to the highest possible temperature that does not result in film breakage in the tenter and the film can be relaxed in the transverse direction in the vicinity of the heat-set zone which decreases the tension of the film. Higher shrinkage can be achieved by reducing the heat set temperature, by reducing the duration of the heat set treatment for a given heat set temperature, by eliminating the heat set step, and/or reducing the relaxation of the film in the block direction. In some embodiments, in order to provide a desired shrinkage of the reflective polarizer for the polarizer stacks of the present description, a heat set step is applied with a reduced temperature selected to give the desired shrinkage and/or the relaxation of the film in the block direction is reduced. According to the present description, it has been found that the desired shrinkage of the reflective polarizer in the polarizer stack, is typically in a range of 0.4 percent to 3 percent along the block axis of the reflective polarizer when the reflective polarizer is heated at 95° C. for 40 minutes. In some embodiments, the reflective polarizer has a shrinkage in a range of 0.5 percent to 2.5 percent, or in a range of 0.6 percent to 2 percent, along the block axis of the reflective polarizer when the reflective polarizer is heated at 95° C. for 40 minutes.

Shrinkage of a multilayer reflective polarizer can be determined according to the ASTM D2732-14 test standard. The shrinkage is determined for the reflective polarizer as a stand-alone film that is not bonded or laminated to another substrate. For example, when the shrinkage of a reflective polarizer included in a polarizer stack is specified, unless indicated differently, the shrinkage refers to the shrinkage of the reflective polarizer alone without other layers (e.g., the absorbing polarizer) in the polarizer stack included.

Figure 1:
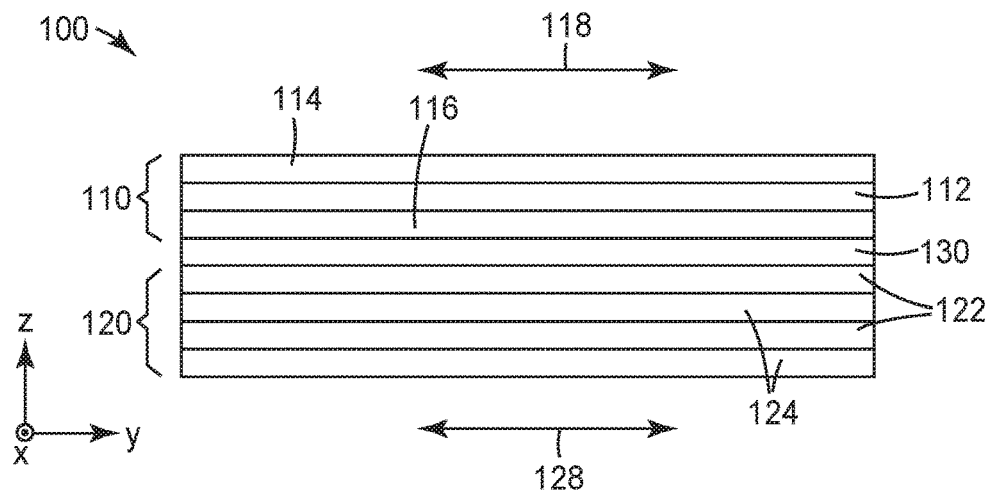
FIG. 1 is a schematic cross-sectional view of a polarizer stack.

FIG. 1 is a schematic cross-sectional view of polarizer stack 100 which includes an absorbing polarizer 110 and a reflective polarizer 120 bonded together through adhesive layer 130. The absorbing polarizer 110 includes an optically active layer 112 disposed between first and second protective layers 114 and 116. In some embodiments, one or both protective layers may be eliminated. In some embodiments, the optically active layer 112 is an oriented polymer layer that may include a dichroic dye or may include iodine. In some embodiments, the oriented polymer is oriented polyvinyl alcohol. The optically active layer 112 may have a thickness in the range of 1 micrometers, or 2 micrometers, or 3 micrometers, or 5 micrometers to 50 micrometer or to 100 micrometers. For example, the optically active layer 112 may have a thickness in the range of 1 micrometers to 50 micrometers. The first and second protective layers 114 and 116 may be cellulose triacetate (TAC) or poly(methyl methacrylate) (PMMA) layers, for example.

The reflective polarizer 120 includes first polymer layers 122 alternating with second polymer layers 124. Four layers are shown in FIG. 1 for ease of illustration, but reflective polarizer 120 may include tens, or hundreds, or even thousands of layers. The absorbing polarizer 110 has a first block axis 118 and the reflective polarizer has a second block axis 128. The first and second block axes 118 and 128 are substantially parallel and in the illustrated embodiment are parallel to the y-axis, referring to the x-y-z coordinate system of FIG. 1.

In the illustrated embodiment, the absorbing polarizer 110 and the reflective polarizer 120 are bonded together through an adhesive layer 130. Adhesive layer 130 can be any suitable adhesive and may be an optically clear or diffuse pressure sensitive adhesive. Suitable adhesives include Soken 1885 acrylic pressure sensitive adhesive available from Soken Chemical and Engineering Co., Ltd., Tokyo, Japan, and 3M 8171 acrylic pressure sensitive adhesive available from 3M Company, St. Paul, Minn. In alternate embodiments, the adhesive layer 130 is omitted and the absorbing polarizer 110 and the reflective polarizer 120 are bonded together through the application of heat (for example, using a heated roll laminator).

The reflective polarizer 120 has a shrinkage in a range of 0.4 percent to 3 percent along the second block axis 128 when the reflective polarizer 120 is heated at 95° C. for 40 minutes. In some embodiments, this shrinkage is at least 0.5 percent, or at least 0.6 percent. In some embodiments, this shrinkage is no more than 2.5 percent, or no more than 2 percent. In some embodiments, this shrinkage is such that the reflective polarizer 120 is substantially free of micro-wrinkling (and in some embodiments, also substantially free of macro-wrinkling) when the polarizer stack 100 is heated at 95° C. for 100 hours or for 1000 hours. In some embodiments, this shrinkage is such that the reflective polarizer 120 is substantially free of micro-wrinkling (and in some embodiments, also substantially free of macro-wrinkling) when the polarizer stack 100 is heated at 100° C. for 100 hours or for 1000 hours. In some embodiments, this shrinkage is 0.9 to 3 times a shrinkage of the absorbing polarizer 110 along the first block axis 118 when the reflective polarizer stack is heated at 95° C. for 40 minutes. A reflective polarizer may be said to be substantially free of micro-wrinkling, when no micro-wrinkling is visible when examined under an optical microscope at a magnification of 200 times.

In some embodiments, the polarizer stack includes an adhesive layer disposed on the absorbing polarizer opposite the reflective polarizer. This adhesive layer may be included as an outer layer of the absorbing polarizer (e.g., the adhesive layer of the Sanritz HLC2-5618S absorbing polarizer (Sanritz Corp., Tokyo, Japan)) or may be a separate adhesive layer applied to the absorbing polarizer (e.g., a pressure sensitive adhesive such as 3M 8171 Optically Clear Adhesive (3M Company, St. Paul Minn.)). The adhesive layer allows to the polarizer stack to be laminated to a glass layer; for example, the glass layer in a liquid crystal display panel facing the backlight (see FIG. 2). Unless specified differently, micro-wrinkling of a reflective polarizer in a polarizer stack is tested by maintaining the polarizer stack laminated to a sheet of glass with the absorbing polarizer between the glass and the reflective polarizer at a specified temperature for a specified time, allowing the laminate of the glass and polarizer stack to cool to room temperature, and then examining the reflective polarizer for micro-wrinkling.

Polarizer stack 100 is useful as a polarizer in a liquid crystal display (LCD). A liquid crystal display typically includes a display panel between crossed polarizers. Polarizer stack 100 can be used as either or both of the crossed polarizers. In such display applications, the polarizer stack 100 is typically oriented with absorbing polarizer 110 facing the viewer and with the reflective polarizer 120 facing the backlight.

Figure 2:
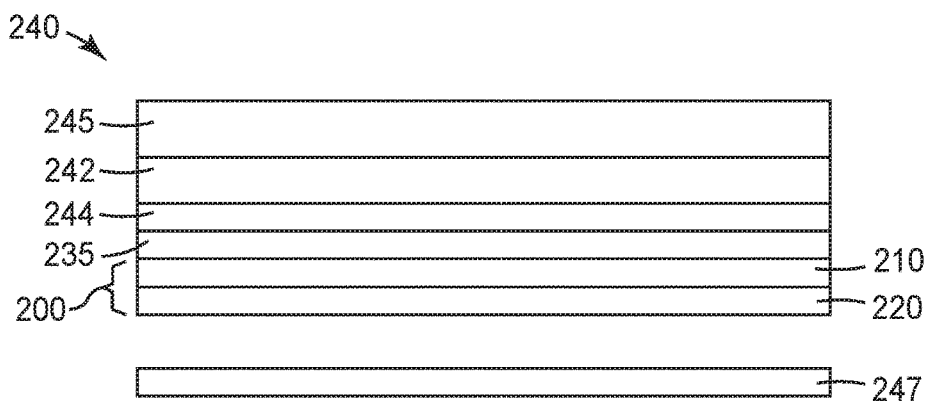
FIG. 2 is a schematic cross-sectional view of a display including a polarizer stack.

FIG. 2 is a schematic cross-sectional view of display 240 including a liquid crystal layer 242 disposed between two glass layers 244 and 245, and a polarizer stack 200 adhered to the glass layer 244 with adhesive layer 235. Display 240 further includes a backlight 247. It will be understood that additional layers, such as Brightness Enhancement Films (available from 3M Company, St. Paul, Minn.) can be disposed between the polarizer stack 200 and the backlight 247. Polarizer stack 200 may be any of the polarizer stacks of the present description. For example, polarizer stack 200 may correspond to polarizer stack 100. Polarizer stack 200 includes an absorbing polarizer 210 and a reflective polarizer 220 with the absorbing polarizer 210 facing the glass layer 244 and the reflective polarizer 220 facing the backlight 247. The absorbing polarizer 210 and the reflective polarizer 220 may be laminated together with an adhesive layer (not shown) or may be laminated together through the application of heat, for example. In some embodiments, the reflective polarizer 220 is substantially free of micro-wrinkling when the polarizer stack 200 laminated to a sheet of glass is heated at 95° C. for 100 hours or for 1000 hours. In some embodiments, the reflective polarizer 220 is substantially free of micro-wrinkling when the polarizer stack 200 laminated to a sheet of glass is heated at 100° C. for 100 hours or for 1000 hours. In some embodiments, the reflective polarizer 220 is substantially free of both micro-wrinkling and macro-wrinkling when the polarizer stack 200 laminated to a sheet of glass is heated according to any of the temperature profiles described above. Adhesive layer 235 can be any suitable adhesive such as optically clear or diffuse pressure sensitive adhesives as described elsewhere herein.

EXAMPLES

Five variations of a multilayer reflective polarizer were made according to the method described in U.S. Pat. No. 6,827,886 (Neavin et al.). The films had alternating birefringent and non-birefringent micro-layers; 153 of these were birefringent and 152 were non-birefringent. The birefringent layers were produced from a 90%/10% (by moles) random copolymer of polyethylene naphthalate (PEN) and polyethylene terephthalate (PET) at 42.3 wt % of the total extrusion rate. The non-birefringent layers were produced from a blend of two copolymers, with the first being 20.9 wt % of the total extrusion rate of a 90%/10% (by moles) copolymer of PEN and PET along with 28.9 wt % the total extrusion rate of glycol modified PET (PETg, available from Eastman Chemicals, Kingsport Tenn.). The skin layers on top and bottom of the film were produced from the same PETg as the non-birefringent microlayers; they were of equal thickness and represented 7.8 wt % of the total extrusion rate.

The films were each stretched on a standard tenter with a draw ratio of about six in the transverse direction and no stretching in the machine direction. The five variations differed only according to the stretch conditions that were applied. Those conditions were: the temperature to which the film was pre-heated, the temperature at which it was stretched, the heat-set temperature in a first zone of the heat-set section of the tenter, the heat-set temperature in a second zone of the heat-set section of the tenter, and the percent toe-in. Percent toe-in was the amount the rails were moved inward during heat setting and subsequent cooling step compared to the rail setting at the end of stretching. Stretch conditions A, B, C, D and E are identified in Table 1.

TABLE 1

| Condition | Pre-heat Temp (° F.) | Stretch Temp (° F.) | Heat-set Zone 1 Temp (° F.) | Heat-set Zone 2 Temp (° F.) | % Toe-in |
|---|---|---|---|---|---|
| A | 308 | 284 | 291 | 291 | 0.9% |
| B | 308 | 284 | 290 | 290 | 0 |
| C | 308 | 284 | 218 | 211 | 0 |
| D | 308 | 281 | 190 | 180 | 0 |
| E | 303 | 273 | 182 | 180 | 0 |

Shrinkage was then measured for the five orientation conditions and for the Sanritz HLC2-5618S Absorbing Polarizer (available from Sanritz Corp., Tokyo, Japan). The shrinkage was measured using the ASTM D2732-14 test standard. Shrinkage was measured in both pass and block axis directions after exposure to 95 degrees C. for 40 minutes. Values are presented in Table 2.

TABLE 2

| Condition | Shrinkage at 95° C. after 40 minutes in Block state direction | Shrinkage at 95° C. after 40 minutes in Pass state direction |
|---|---|---|
| A | 0.09% | 0.29% |
| B | 0.26% | 0.24% |
| C | 0.74% | 0.68% |
| D | 1.46% | 1.02% |
| E | 2.65% | 1.87% |
| Sanritz HLC2-5618S Absorbing Polarizer | 0.37% | 0.24% |

Extended time shrinkage testing at 95 degrees C. was also done for the five multilayer film polarizer variations and the Sanritz absorbing polarizer. Data for shrinkage in the block direction are shown in FIG. 4, and shrinkage data for the pass direction are shown in FIG. 5.

Figure 4:
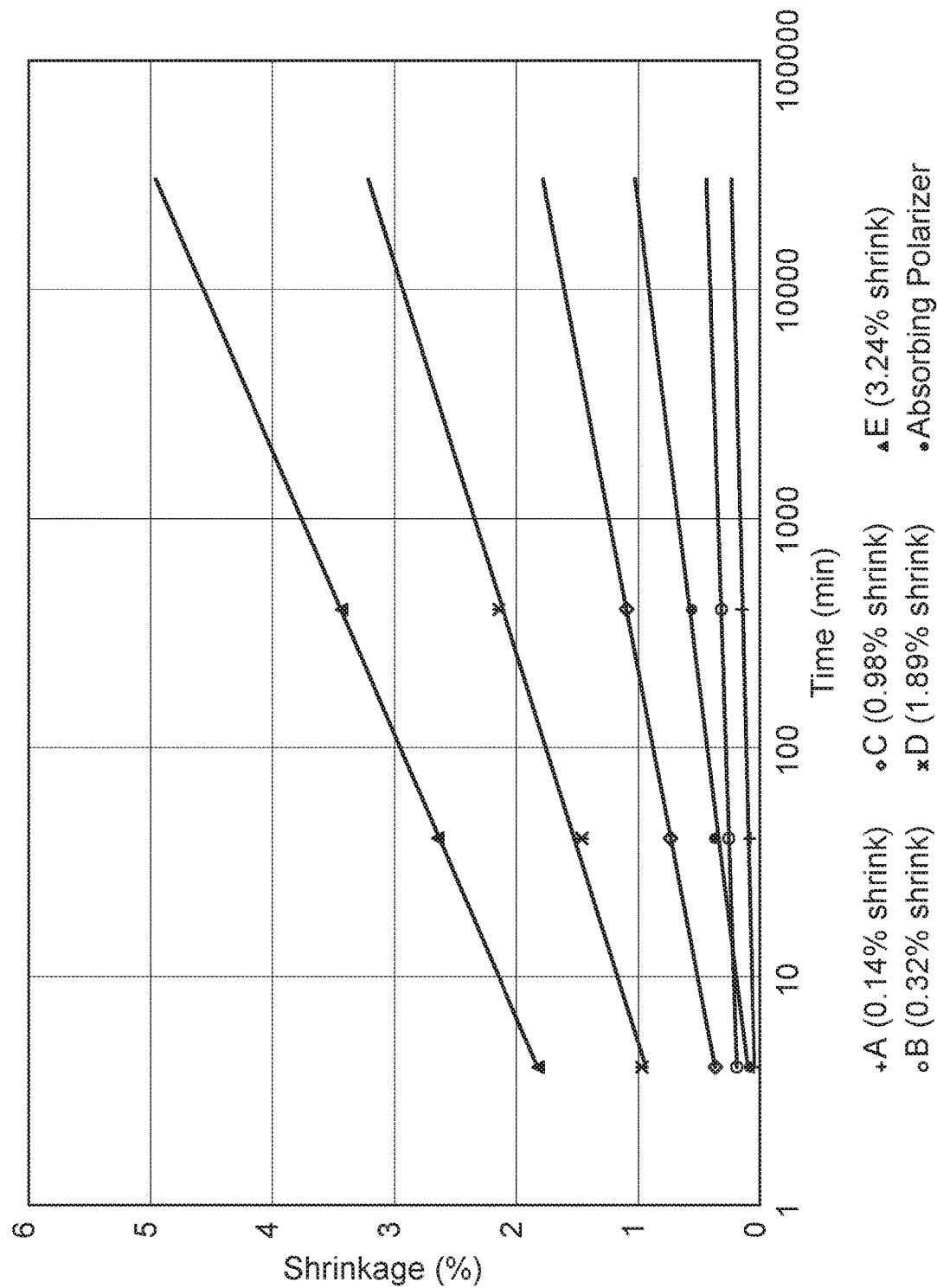
FIG. 4 is a plot of shrinkage of various polarizers along the block axis versus time.
Figure 5:
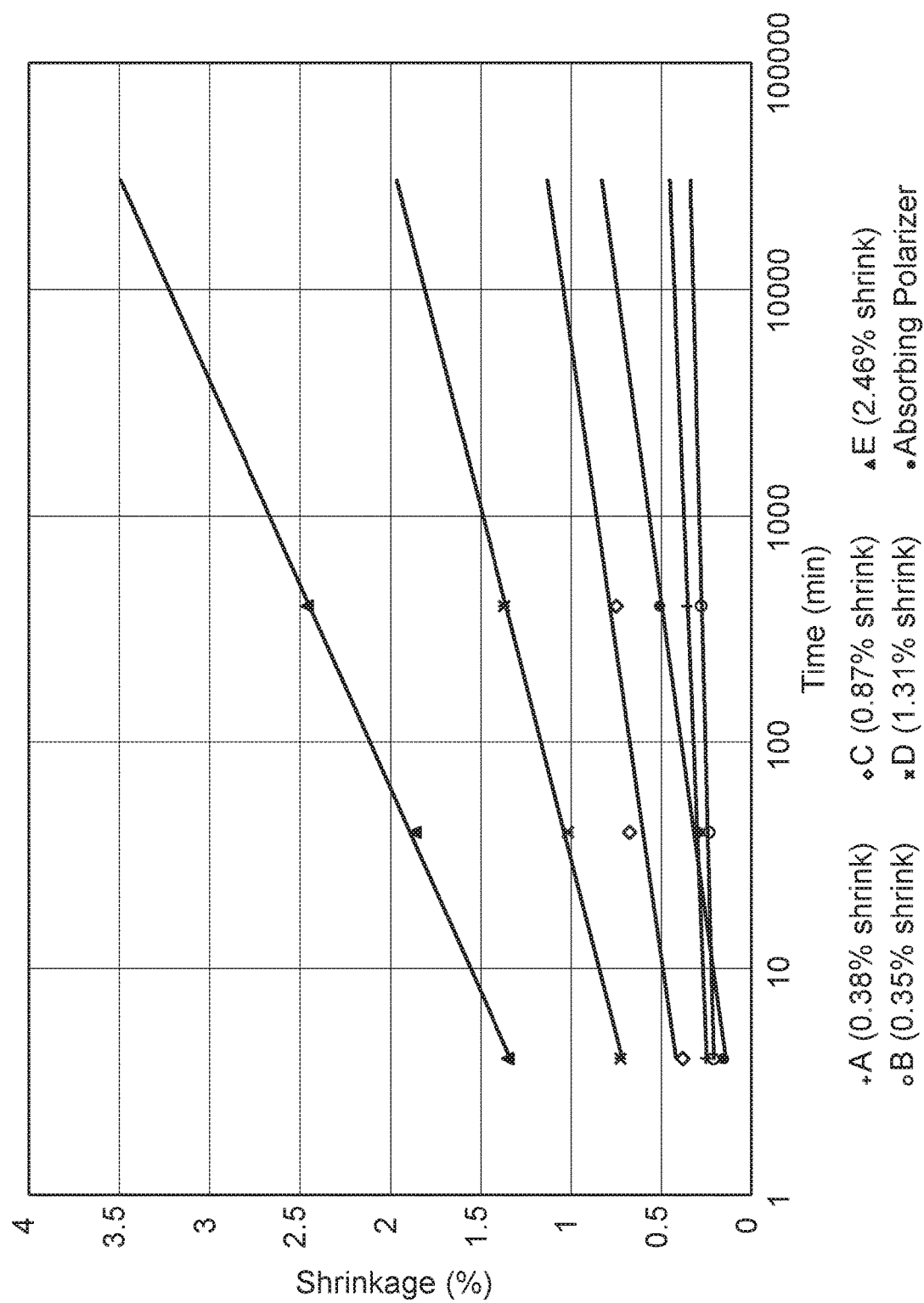
FIG. 5 is a plot of shrinkage of various polarizers along the pass axis versus time.

The data in FIGS. 4-5 show that the shrinkage of the absorbing polarizer increased at a higher rate than the two reflective polarizers (Condition A and B reflective polarizers) produced with similar 4 minute shrinkages for both block-state and pass-state directions. Comparing FIGS. 4 and 5, it is also apparent that the shrinkage in the block-state direction for long times was larger than the shrinkage in the pass-state direction for the absorbing polarizer.

To test for micro-wrinkling, twenty-one samples of each of the reflective polarizers produced under Conditions A, B, C, D and E were chosen, and a piece approximately 1.25 in by 1.25 inch (3.2 cm by 3.2 cm) was cut from each sample. These pieces were then adhered to the non-adhesive side of similarly sized pieces of Sanritz HLC2-5618S absorbing polarizer using a pressure sensitive adhesive (8171 Optically Clear Adhesive from 3M Company, St. Paul Minn.) with the block axis of the reflective polarizer parallel to the block axis of the absorbing polarizer. Each construction was then laminated to glass using the adhesive of the absorbing polarizer to adhere the polarizer to the glass to create test samples. Three test samples of each construction were then placed in one of six ovens. These ovens were set to 80, 85, 90, 95, 100, and 105 degrees C. Three test samples were held at room temperature (RT). The test samples were held at their respective temperatures for 1000 hours.

Micro-wrinkling was determined by examining the surface texture of the test samples. When micro-wrinkling has appeared, it has been manifested as objectionable haze in the film. Examined under a microscope at a magnification between 50× and 200×, micro-wrinkling has been observed as a permanent corrugation of the optical layers, and a rough exterior layer of the reflective polarizer could be observed.

Figure 6:
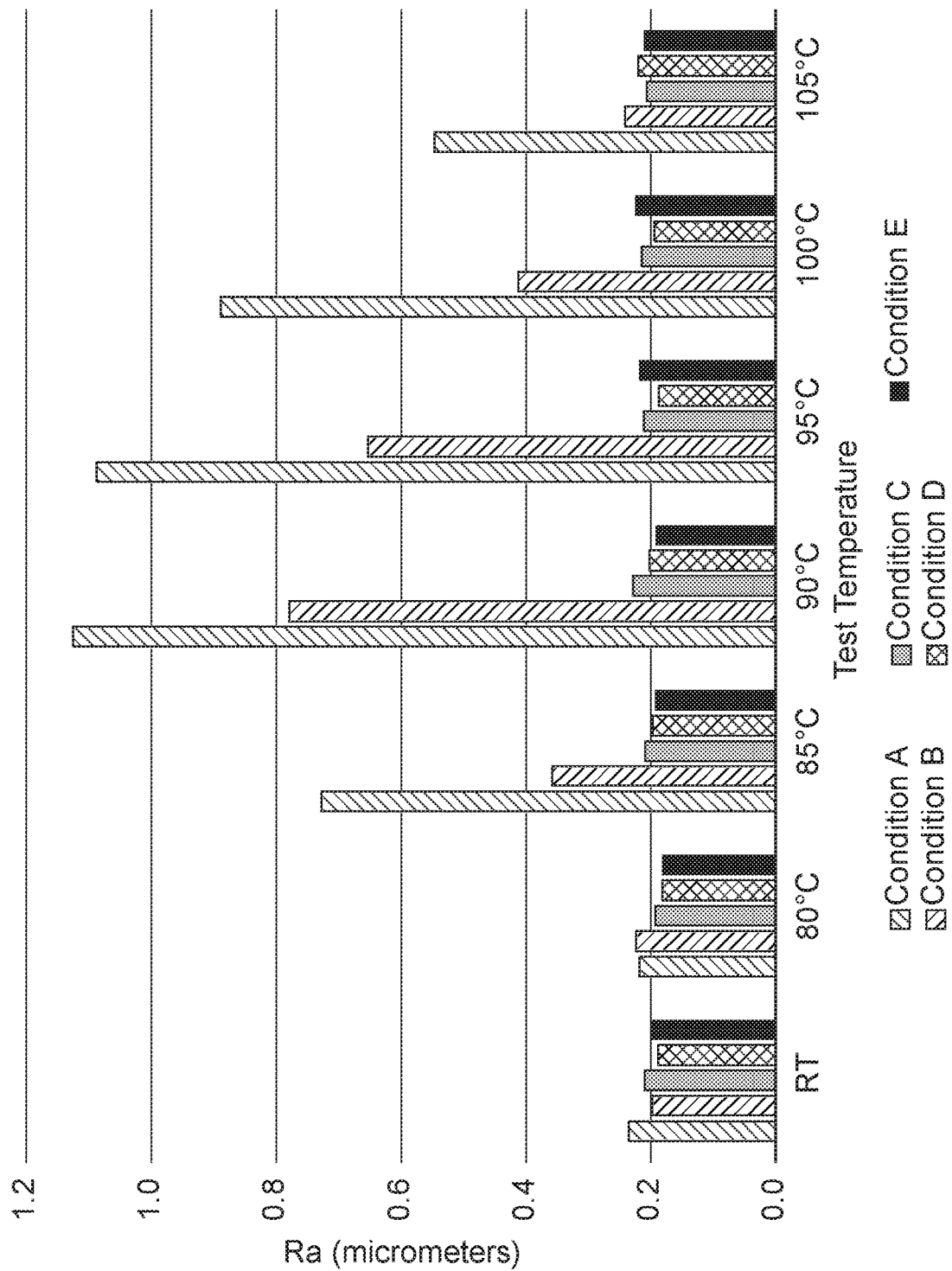
FIG. 6 is a bar graph of roughness for various polarizers held at various temperatures for 1000 hours.

A Perthometer M2 roughness measuring instrument produced by Mahr GmbH (Providence, R.I., USA) was used to characterize the surface roughness in the block direction of the reflective polarizer in the test samples used in micro-wrinkle testing. The results characterized by the surface roughness measure Ra (average of three samples) are shown in FIG. 6. These surface roughness results in combination with FIGS. 4-5 showed that increased shrinkage in the reflective polarizer can reduce the severity of micro-wrinkling.

The following is a list of exemplary embodiments of the present description.

Embodiment 1 is a polarizer stack comprising an absorbing polarizer having a first block axis and a multilayer polymeric reflective polarizer having a second block axis substantially parallel to the first block axis, the absorbing polarizer and the reflective polarizer bonded together, wherein the reflective polarizer, prior to being bonded to the absorbing polarizer, has a shrinkage in a range of 0.4 percent to 3 percent along the second block axis when the reflective polarizer is heated at 95° C. for 40 minutes.

Embodiment 2 is the polarizer stack of Embodiment 1, wherein the absorbing polarizer and the reflective polarizer are bonded together through an adhesive layer.

Embodiment 3 is the polarizer stack of Embodiment 1, wherein the shrinkage is in a range of 0.5 percent to 2.5 percent.

Embodiment 4 is the polarizer stack of Embodiment 1, wherein the shrinkage is in a range of 0.6 percent to 2 percent.

Embodiment 5 is the polarizer stack of Embodiment 1 further comprising an adhesive layer disposed on the absorbing polarizer opposite the reflective polarizer, wherein the shrinkage is such that the reflective polarizer is substantially free of micro-wrinkling when the polarizer stack laminated to a glass sheet through the adhesive layer is heated at 95° C. for 100 hours.

Embodiment 6 is the polarizer stack of Embodiment 1 further comprising an adhesive layer disposed on the absorbing polarizer opposite the reflective polarizer, wherein the shrinkage is such that the reflective polarizer is substantially free of micro-wrinkling when the polarizer stack laminated to a glass sheet through the adhesive layer is heated with the glass sheet at 100° C. for 1000 hours.

Embodiment 7 is the polarizer stack of Embodiment 1, wherein the shrinkage of the reflective polarizer is 0.9 to 3 times a shrinkage of the absorbing polarizer along the first block axis when the polarizer stack is heated at 95° C. for 40 minutes.

Embodiment 8 is the polarizer stack of Embodiment 1, wherein the absorbing polarizer comprises polyvinyl alcohol.

Embodiment 9 is the polarizer stack of Embodiment 8, wherein the absorbing polarizer further comprises iodine.

Embodiment 10 is the polarizer stack of Embodiment 1, wherein the absorbing polarizer comprises an optically active oriented polymer layer bonded to at least one protective layer.

Embodiment 11 is the polarizer stack of Embodiment 10, wherein the optically active oriented polymer layer comprises polyvinyl alcohol and iodine.

Embodiment 12 is the polarizer stack of Embodiment 10, wherein the optically active oriented polymer layer has a thickness in a range of 1 to 50 micrometers.

Embodiment 13 is the polarizer stack of Embodiment 1, wherein the reflective polarizer comprises a plurality of alternating first and second polymer layers, at least one of the first and second polymer layers being birefringent.

Embodiment 14 is the polarizer stack of Embodiment 1, wherein the reflective polarizer comprises a plurality of alternating first and second polymer layers, the first polymer layers having a first refractive index along the second block axis, the second polymer layers having a second refractive index along the second block axis, the second refractive index lower than the first refractive index, the second polymer layers having a glass transition temperature less than 100° C.

Embodiment 15 is the polarizer stack of Embodiment 14, wherein the glass transition temperature is less than 95° C.

Embodiment 16 is the polarizer stack of Embodiment 14, wherein the glass transition temperature is less than 80° C.

Embodiment 17 is the polarizer stack of Embodiment 14, wherein the glass transition temperature is less than 60° C.

Embodiment 18 is a display comprising a backlight, a glass layer and the polarizer stack of claim 1, the polarizer stack further comprising an adhesive layer disposed on the absorbing polarizer opposite the reflective polarizer, the polarizer stack adhered to the glass layer through the adhesive layer, the polarizer stack disposed between the glass layer and the backlight.

Embodiment 19 is the display of Embodiment 18, wherein the reflective polarizer is substantially free of micro-wrinkling when the polarizer stack adhered to the glass layer is heated at 95° C. for 100 hours.

Embodiment 20 is the display of Embodiment 18, wherein the reflective polarizer is substantially free of micro-wrinkling when the polarizer stack adhered to the glass layer is heated at 95° C. for 1000 hours.

Embodiment 21 is the display of Embodiment 18, wherein the reflective polarizer is substantially free of micro-wrinkling when the polarizer stack adhered to the glass layer is heated at 100° C. for 1000 hours.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A polarizer stack of comprising an absorbing polarizer having a first block axis and a multilayer polymeric reflective polarizer having a second block axis substantially parallel to the first block axis, the absorbing polarizer and the reflective polarizer bonded together, wherein the reflective polarizer is substantially free of micro-wrinkling when the polarizer stack laminated to a glass sheet through an adhesive layer disposed on the absorbing polarizer opposite the reflective polarizer is heated with the glass sheet at 95° C. for 100 hours, wherein the reflective polarizer, prior to being bonded to the absorbing polarizer, has a shrinkage in a range of 0.5 percent to 2.5 percent along the second block axis when the reflective polarizer is heated at 95° C. for 40 minutes.

2. The polarizer stack of claim 1, wherein the shrinkage is in a range of 0.6 percent to 2 percent.

3. A polarizer stack comprising an absorbing polarizer having a first block axis and a multilayer polymeric reflective polarizer having a second block axis substantially parallel to the first block axis, the absorbing polarizer and the reflective polarizer bonded together, wherein the reflective polarizer is substantially free of micro-wrinkling when the polarizer stack laminated to a glass sheet through an adhesive layer disposed on the absorbing polarizer opposite the reflective polarizer is heated with the glass sheet at 95° C. for 100 hours, wherein the reflective polarizer, prior to being bonded to the absorbing polarizer, has a shrinkage in a range of 0.4 percent to 3 percent along the second block axis when the reflective polarizer is heated at 95° C. for 40 minutes.

4. A polarizer stack comprising an absorbing polarizer having a first block axis and a multilayer polymeric reflective polarizer having a second block axis substantially parallel to the first block axis, the absorbing polarizer and the reflective polarizer bonded together, wherein the reflective polarizer, prior to being bonded to the absorbing polarizer, has a shrinkage in a range of 0.4 percent to 3 percent along the second block axis when the reflective polarizer is heated at 95° C. for 40 minutes, wherein the absorbing polarizer comprises an optically active oriented polymer layer bonded to at least one protective layer.

* * * * *